US008559911B2

(12) United States Patent
Wang et al.

(10) Patent No.: US 8,559,911 B2
(45) Date of Patent: Oct. 15, 2013

(54) METHOD AND SYSTEM FOR A HOME NODEB OF HYBRID ACCESS MODE TO OBTAIN THE ACCESS MODE OF A USER EQUIPMENT

(75) Inventors: Shengming Wang, Shenzhen (CN); Jin Xi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,331

(22) PCT Filed: Mar. 5, 2010

(86) PCT No.: PCT/CN2010/070890
§ 371 (c)(1),
(2), (4) Date: Feb. 1, 2012

(87) PCT Pub. No.: WO2011/015047
PCT Pub. Date: Feb. 10, 2011

(65) Prior Publication Data
US 2012/0129483 A1 May 24, 2012

(30) Foreign Application Priority Data

Aug. 4, 2009 (CN) .......................... 2009 1 0090430

(51) Int. Cl.
*H04M 11/04* (2006.01)
(52) U.S. Cl.
USPC .................... 455/404.1; 455/435.1; 455/433; 455/434; 455/552.1
(58) Field of Classification Search
USPC ................. 455/404.1, 435.1, 433, 434, 552.1
See application file for complete search history.

(56) References Cited

U.S. PATENT DOCUMENTS 8,072,953 B2 * 12/2011 Mukherjee et al. ........... 370/338
2006/0199536 A1 9/2006 Eisenbach (Continued)

FOREIGN PATENT DOCUMENTS

| CN | 101202720 A | 6/2008 |
|---|---|---|
| EP | 1641180 A1 | 3/2006 |
| EP | 2043404 A1 | 4/2009 |
| WO | 2008134281 A2 | 11/2008 |
| WO | 2009043262 A1 | 4/2009 |

OTHER PUBLICATIONS

International Search Report in international application No. PCT/CN2010/070890, mailed on Jun. 10, 2010.
English Translation of the Written Opinion of the International Search Authority in international application No. PCT/CN2010/070890, mailed on Jun. 10, 2010.

(Continued)

*Primary Examiner* — Temica M Beamer
(74) *Attorney, Agent, or Firm* — Oppedahl Patent Law Firm LLC

(57) ABSTRACT

A Method and a system for a Home NodeB (HNB) of Hybrid Access Mode to obtain the access mode of a User Equipment (UE) are provided by the present disclosure. During the registering process of the UE, a Home NodeB Gateway (HNB GW) determines the access membership of the UE according to the capability, the register reason of the UE and the access mode of the HNB itself, and transmits the access mode of the UE to the HNB. The method of the present disclosure enables the HNB of Hybrid Access Mode to differentiate subscribers from non-subscribers, therefore ensuing that users of different memberships (Close/Open) are processed differently, so that HNB can realize indeed to process services of different UEs corresponding to different Quality of Service (QoSes).

13 Claims, 7 Drawing Sheets

(56) References Cited

U.S. PATENT DOCUMENTS

| | | | |
|---|---|---|---|
| 2008/0267153 A1 | 10/2008 | Mukherjee et al. | |
| 2009/0070694 A1 | 3/2009 | Ore et al. | |
| 2009/0305671 A1* | 12/2009 | Luft et al. | 455/411 |
| 2009/0305699 A1* | 12/2009 | Deshpande et al. | 455/434 |
| 2010/0112980 A1* | 5/2010 | Horn et al. | 455/411 |
| 2010/0203865 A1* | 8/2010 | Horn et al. | 455/411 |

OTHER PUBLICATIONS

HNB Access Mode handling procedure Feb. 2009.
Access Control for Inbound Handover from 3G Marco Cell to 3G HNB Cell Mar. 2009.

* cited by examiner

METHOD AND SYSTEM FOR A HOME NODEB OF HYBRID ACCESS MODE TO OBTAIN THE ACCESS MODE OF A USER EQUIPMENT

TECHNICAL FIELD

The disclosure relates to Home NodeB technology, particularly to a method and a system for a Home NodeB (HNB) of Hybrid Access Mode to obtain the access mode of a User Equipment (UE).

BACKGROUND

The Home NodeB (HNB) is a small-type and low-powered base station, deployed in indoor places such as home and office. The HNB is mainly used for providing users with higher service rate and reducing service costs required for enjoying high-speed service, meanwhile, compensating the overlap defect of current allocated cellular radio communication system. The HNB is featured with low-cost, convenience, low-power output and plug-and-play.

FIG. 1 is a schematic diagram of the structure of an HNB system. As shown in FIG. 1, an HNB user is connected to a core network via a Home NodeB Access Network (HNB AN), wherein the HNB AN is composed of a Home NodeB (HNB) and a Home NodeB Gateway (HNB GW), generally with a security gateway therebetween. The HNB GW is mainly functioned to verify security of the HNB, to process the registering of the HNB and an access control, and to exchange data between the core network and the HNB. A Home NodeB Management System (HMS) is used for managing the operation and maintenance of an HNB, for configuring and controlling the HNB according to the requirement of service providers, mainly for realizing the configuration and management function for the HNB, including the verification of location information and the parameter configuration for the HNB.

With the development of technology, the HNB is introduced with a concept of Close Subscriber Group (CSG), thus, the HNB can be classified into two types: a CSG supported NodeB and a CSG not-supported NodeB, meanwhile, user equipment (UE) can also be divided into two types: CSG supported UE and CSG not-supported UE, wherein the CSG supported UE can read CSG information from system broadcast and make an initial access judgment according to an Allowed CSG List of itself. The Allowed CSG List is a list of CSGs subscribed with a UE, and is saved in the UE and a core network (CN). Corresponding to the Allowed CSG List, the HNB GW preserves a list of IMSIs of UEs subscribed with the HNB, namely, the Allowed CSG List is a judgment basis for the CN to make an access control on a UE, and the IMSI list of UEs subscribed with the HNB is a judgment basis for the HNB GW to make an access control on a UE. Existing standards prescribe that, for a CSG not-supported UE or a CSG not-supported HNB, an access control on a UE is completed at the HNB-GW; and if both a UE and an HNB supports CSG function, an access control on the UE is completed at a CN.

FIG. 2 shows a flow chart of UE access in the case that a UE or an HNB does not support CSG function, As shown in FIG. 2, for a CSG not-supported UE or a CSG not-supported HNB, step 200-step 204 are implemented firstly: a UE establishes an is RRC connection with an HNB, during this process, the UE transmits its identifier (such as IMSI or TMSI), capability information and version information to the HNB; the UE transmits an RRC initial direct transmission message to the HNB, the message including an initial NAS message, such as Attach Request or Location Update (LU) Request or other NAS messages; the HNB checks whether the identifier of the UE is locally recorded, if there is no record of a Connect-ID allocated to the UE, then step 205 is executed, and if there is a record of a Connect-ID allocated to the UE, then registering is not needed; besides, prior to registering, the HNB may possibly trigger a flow of obtaining UE IMSI; the HNB optionally makes an access control via the IMSI of the UE, as well as it may performs an access control via local resources.

Then step 205-step 207 follow: the HNB transmits a UE register message to the HNB-GW, the HNB-GW judges whether to perform an access control on the UE according to the capability of the UE and an access reason. If an access control is needed to be performed, the HNB GW performs an access control on the UE according to the IMSI list of the UEs subscribed with the HNB. The UE whose IMSI is contained in the IMSI list or the UE who is making an emergency call is allowed access, and the UE is allocated with a Connect-ID as a signaling connection identifier, and it responds the HNB via a UE register accept message, otherwise, the HNB GW transmits a UE register reject message to the HNB. If Connect-ID information of the UE is preserved at the HNB locally, the access of the UE to a core network is carried out with taking the Connect-ID as a signaling connection identifier directly, without registering of the UE.

At last, step 208-step 211 follow: if the HNB accepts the access of the UE, then the HNB transmits a CONNECT message, wherein the CONNECT message includes an RANAP Initial UE message; upon receiving the CONNECT message, the HNB-GW forwards the Initial UE Message to the CN to trigger an SCCP establishment; the CN acknowledges the message for the SCCP connection; and the UE continues the NAS flow.

FIG. 3 shows a flow chart of UE access in the case that a UE and an HNB simultaneously support CSG function. As shown in FIG. 3, firstly, step 300-step 304 are: the UE and the HNB establish an RRC connection, during this process, the UE transmits is its identifier (e.g. IMSI or TMSI), capability information and version information to the HNB; the UE transmits an RRC initial direct transmission message to the HNB, the message including an initial NAS message, such as Attach Request or LU Request or other NAS messages; the HNB checks the capability of the UE, since the UE supports CSG function, the HNB transmits a UE register message to the HNB GW, and the HNB GW allows all access without an access control on the UE.

Then, step 305-step 309 follow: the HNB GW allocates a Connect-ID as a signaling connection identifier to the UE, and responds the HNB via a UE register accept message, if the HNB accepts the access of the UE, the HNB transmits a CONNECT message which includes an initial UE message; upon receiving the CONNECT message, the HNB-GW forwards the Initial UE Message to the CN to trigger an SCCP establishment; the CN acknowledges the message for the SCCP connection; optionally, a mobility management may be carried out between the UE and the CN, such as an authentication procedure.

At last, step 301-step 311 follow: after the CN performs an access control on the UE, the UE continues the NAS flow.

In addition, there are three access modes for a CSG cell: an Open Access Mode, a Close Access Mode and a Hybrid Access Mode, wherein, the CSG cell of Open Access Mode allows access of any user; the CSG cell of Close Access Mode only allows access of users subscribed with it, and rejects access of any non-subscriber; the CSG cell of Hybrid Access Mode accepts access of both subscribers and non-subscribers.

The access of subscribers is called access of members, as described herein, its actual access mode is Close; the access of non-subscribers is called Open access, wherein, the CSG cell of Hybrid Access Mode performs different QoS controls on users accessing with Close memberships and users accessing with Open memberships, further, in case of short resources, the HNB gives priority to the users accessing with Close memberships to enjoy service, and switches the users who access with Open memberships to a proper macro cell or HNB, or releases them directly, wherein the access mode of the HNB can be notified to the HNB-GW during the HNB registering process.

Thus, for an HNB running in Hybrid Access Mode, it is necessary to know the membership of a UE accessing to a CSG cell of Hybrid Access Mode. Subscription of CSG is related to users, namely the subscription is done with an IMSI. The CSG capability is a feature of a UE, which is relative to hardware and version, for instance the capability for reading system broadcast relative to CSG. Therefore, in actual application, there may exist such a case that for a UE which does not support CSG function (i.e. a non-CSG UE), its users may be registered as subscribers of a certain CSG, namely USIM/SIM of the subscribers is subscribed with the CSG, but software and hardware of the UE do not support functions of the CSG and are used on the UE which does not support the CSG, in this case if the UE accesses to an HNB belonging to the CSG subscribed with the UE, then the IMSI LIST of the HNB preserved in an HNB GW contains IMSI information of the UE. Since an access control on the UE is completed at the HNB GW, for a Hybrid CSG HNB, the specific access mode of the UE can only be known by the HNB-GW but the HNB, namely, according to current UE register flow, the HNB can not distinguish subscribers from non-subscribers. Thus, the HNB can not realize different QoS processing on services of different UEs, specially, in case of short resources, different QoS processing can not be carried out on services of different UEs according to UE access memberships.

SUMMARY

In view of this, the disclosure aims to provide a method for a Home NodeB (HNB) of Hybrid Access Mode to obtain an access mode of a User Equipment (UE), enabling the HNB to distinguish subscribers from non-subscribers, thus guaranteeing the HNB to indeed realize QoS processing differently according to different UE services.

To achieve aforementioned purpose, the technical scheme of the disclosure is realized as follows.

A method for a Home NodeB (HNB) of Hybrid Access Mode to obtain an access mode of a User Equipment (UE), during a UE registering process, when a Home NodeB Gateway (HNB GW) performs an access control on the UE and the HNB is in hybrid is access mode, includes:

the HNB GW determines an access mode of the UE and transmits the access mode to the HNB.

Prior to the method, such operation may be further included:

the HNB completes registering, and notifies its access mode to the HNB GW.

The determining an access mode of the UE may include:

the HNB-GW checks capability and register reason of the UE, thus determining that the UE does not support CSG function and makes a non-emergency call, then the HNB-GW judges whether the UE accesses with an Open membership or with a Close membership, the capability and register reason of the UE being included in a UE register message which is transmitted to the HNB-GW by the HNB;

if the UE accesses with an Open membership, then the access mode of the UE is Open;

if the UE accesses with a Close membership, then the access mode of the UE is Close.

The determining an access mode of the UE may include:

the HNB-GW checks capability and register reason of the UE, determining the UE makes an emergency call, then the HNB-GW determines that the UE accesses with a Close membership and its access mode is Close;

the capability and register reason of the UE are included in a UE register message which is transmitted to the HNB-GW by the HNB.

When the HNB determines that the UE makes an emergency call according to a calling type of the UE, the HNB determines that the UE accesses with a Close membership and the access mode of the UE is Close.

The access mode of the UE may be included into a UE register message, or a radio access bearer (RAB) message, or a new added UE access information notification and transmitted to the HNB.

The access mode of the UE may present Close via default and present Open explicitly; or, it may present Close or Open explicitly.

A system for a Home NodeB (HNB) of Hybrid Access Mode to obtain an access mode of a User Equipment (UE), at least includes an user equipment (UE), a Home NodeB (HNB) and a Home NodeB Gateway (HNB GW), wherein, the HNB is configured for receiving an access mode of the UE from the HNB GW;

the HNB GW is configured for determining an access mode of the UE and transmitting the access mode to the HNB when the HNB GW performs an access control on the UE and the HNB is in Hybrid Access Mode during a UE registering process.

The HNB may be further configured for completing registering, and notifying its access mode to the HNB GW.

It can be seen from the above technical scheme provided by the disclosure that, during a UE registering process, an HNB GW determines the access membership of a UE, and transmits the access mode of the UE to an HNB. With utilization of the method of the disclosure, the HNB of Hybrid Access Mode can distinguish subscribers from non-subscribers, thereby ensuring different processes on users with different memberships (Close/Open), and enabling the HNB to indeed process UE services differently according to different QoSes.

DETAILED DESCRIPTION

Figure 1:
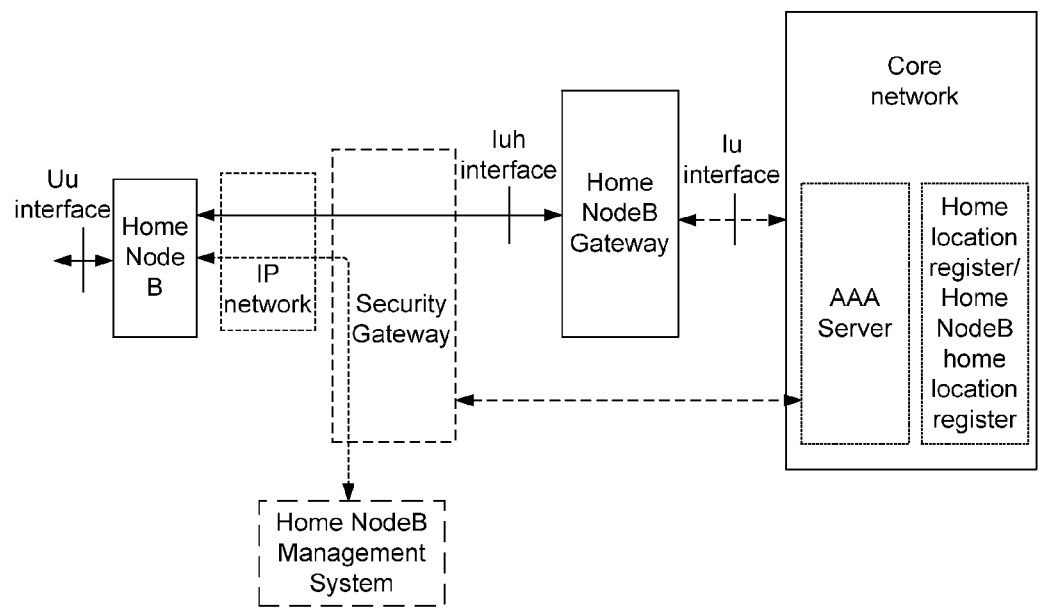
FIG. 1 shows a schematic diagram of the structure of a Home NodeB System.
Figure 2:
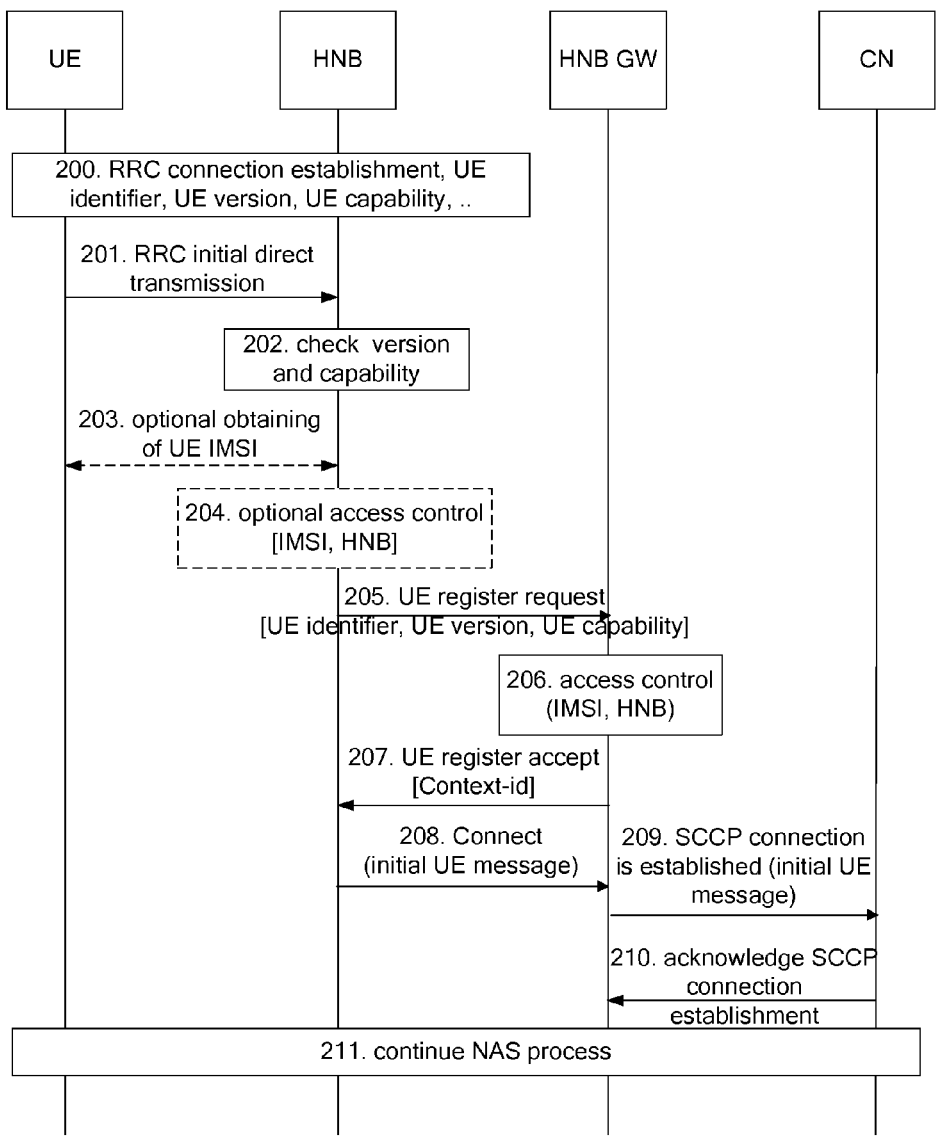
FIG. 2 shows a flow chart of UE access in the case that a UE or an HNB does not support CSG function.
Figure 3:
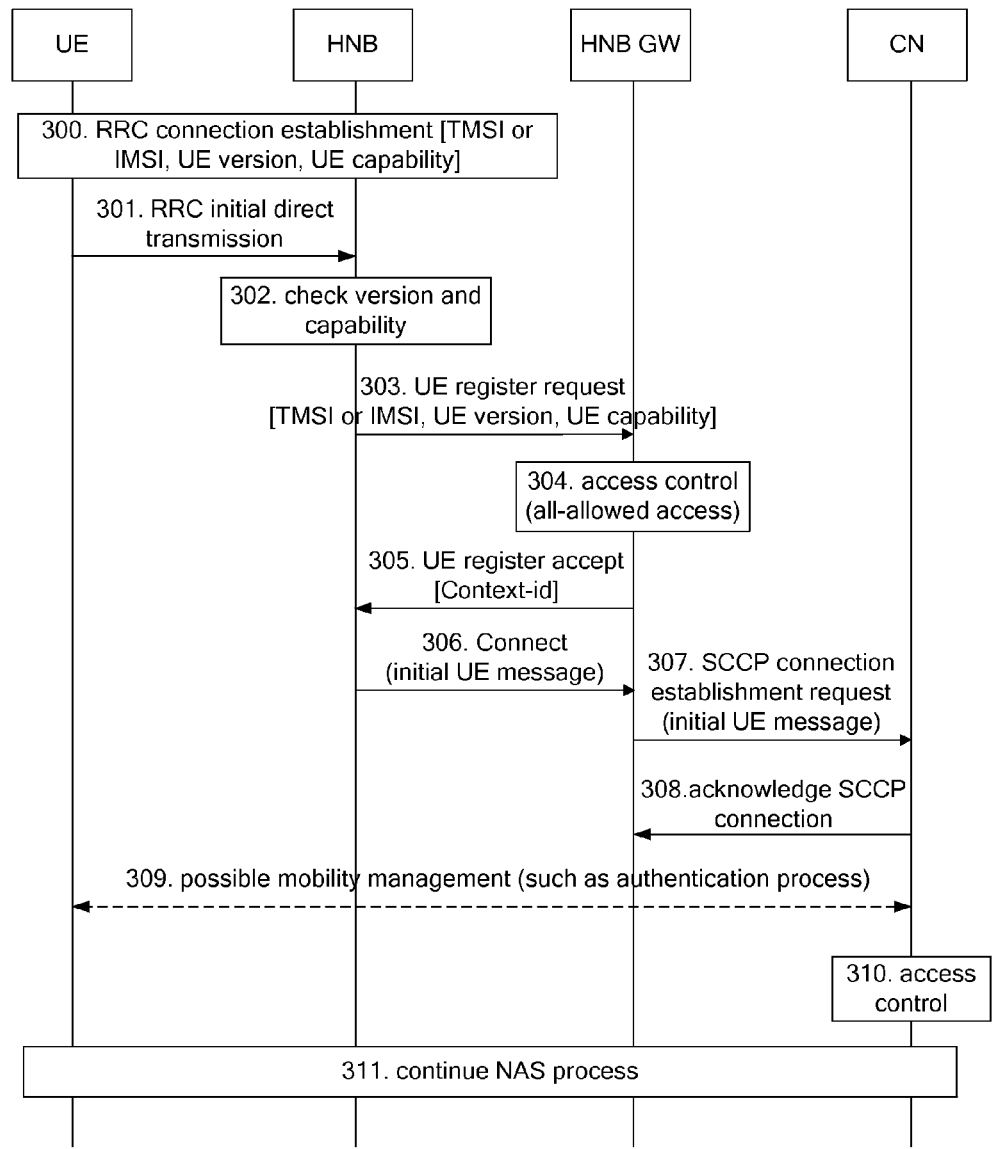
FIG. 3 shows a flow chart of UE access in the case that both a UE and an HNB support CSG function.
Figure 4:
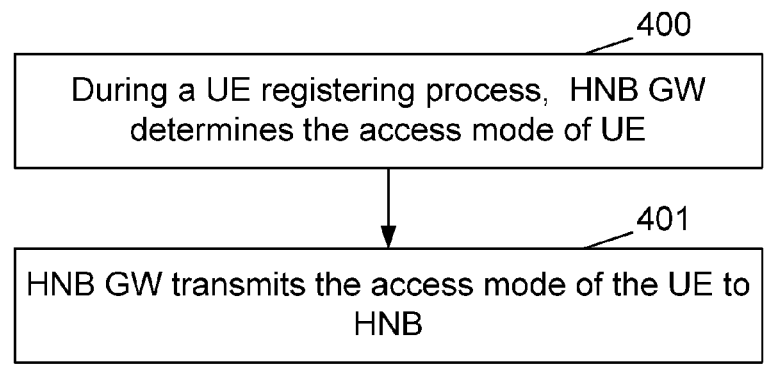
FIG. 4 shows a flow chart of a method for an HNB to obtain the access mode of a UE according to this disclosure.

FIG. 4 shows a flow chart of a method for an HNB to obtain the access mode of a UE, when an HNB GW performs an access control on the UE and the HNB is in Hybrid Access Mode, as shown in FIG. 4, the method includes the following steps:

step 400: during a UE registering process, the HNB GW judges the access mode of the UE;

the HNB-GW checks the capability and the register reason of the UE so that it can determine the UE does not support CSG function and sends a non-emergency call, or the UE sends an emergency call;

if the HNB supports CSG function and its access mode is Hybrid Access Mode, namely the HNB is a Hybrid CSG HNB, the HNB-GW makes an access control judgment on the UE, judging whether the UE accesses with an Open membership or a Close membership; if the UE does not support CSG function and sends a non-emergency call, the HNB-GW judges whether the UE accesses with an Open membership or a Close membership, the judgment basis can be an IMSI list of UEs subscribed with the HNB or other judging methods, this belongs to prior art, so no details repeat; if the UE sends an emergency call, the HNB-GW determines that the UE accesses with a Close membership and its access mode is Close.

It should be noted that, in the case of an emergency call, the HNB can directly is determine that the UE accesses with a Close membership according to UE calling types, thus the access mode of the UE is Close, namely, it is not needed for the HNB GW to transmit the access mode of the UE to the HNB;

step 401: the HNB GW transmits the access mode of the UE to the HNB;

in this step, the HNB GW can include the access mode of the UE into a UE register accept message and transmit it to the HNB.

The following is further included before the method: the HNB completes its register, and notifies its access mode to the HNB GW. This procedure is a precondition of UE access, namely, the HNB register is required to be completed at a first place. After the register of the HNB is completed, the HNB notifies its access mode to the HNB-GW.

According to this method in this disclosure, a system for an HNB of Hybrid Access Mode to obtain the access mode of a UE is provided, at least including a UE, an HNB and an HNB GW, wherein the HNB is configured for receiving an access mode of a UE from the HNB GW;

the HNB GW is configured for determining the access mode of the UE and transmitting the access mode to the HNB when the HNB GW performs an access control on the UE and the HNB is in Hybrid Access Mode during a UE registering process.

The HNB is also configured for completing registering, and notifying its access mode to the HNB GW.

Figure 5:
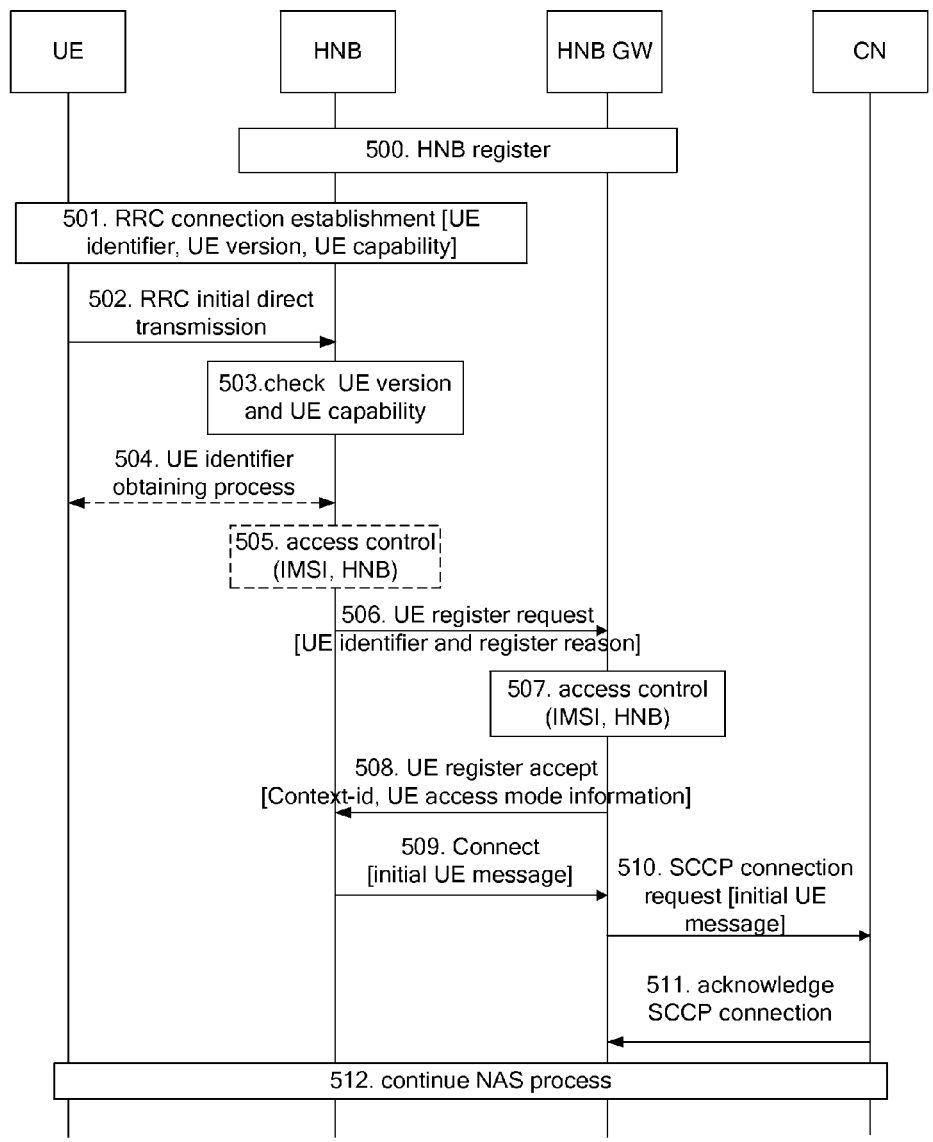
FIG. 5 shows a flow chart of the first embodiment for realizing a registration in an HNB system of this disclosure.

Detailed description for the method of this disclosure is given below in combination with embodiments:

FIG. 5 shows a flow chart of the first embodiment for realizing a registration in the HNB system of this disclosure, in the first embodiment, the access of a non-CSG UE to an HNB of Hybrid Access Mode is carried out by adding a new signal element during a registering process which is an existing register flow of a UE, and the HNB acquires a genuine access membership of the UE; as shown in FIG. 5, this flow includes the following steps:

step 500: the HNB completes registering;

this step is a precondition for UE access, namely it is required to firstly guarantee the completion of the HNB register; after the HNB register is completed, the HNB notifies its access mode to the HNB-GW;

the HNB supports CSG function and its access mode is Hybrid Access Mode;

step 501: the UE establishes an RRC connection with the HNB, during this process, the UE includes its identifier (such as IMSI or TMSI), capability information and version information into an RRC connection establishment message and transmits the message to the HNB;

step 502: the UE transmits an RRC initial direct transmission message to the HNB, this message containing an initial NAS message, such as Attach Request or Location Update (LU) Request and other NAS messages;

step 503: the HNB checks the capability of the UE, if the UE does not support CSG function and its identifier is not recorded in the HNB, namely there is no record of a Connect-ID allocated to the UE, then step 506 is executed; if there is a record of a Connect-ID allocated to the UE in the HNB, then a registration is not needed for the UE, and this flow is terminated;

Further, step 504 may be included: prior to registering, the HNB triggers a flow of obtaining UE IMSI;

Further, step 505 may be included: the HNB performs an access control via IMSI of the UE, as well as via local resources;

step 506: the HNB transmits a UE register request to the HNB-GW, the UE register message including the identifier and register reason of the UE;

step 507: the HNB-GW checks the capability and register reason of the UE, if the UE does not support CSG function and sends a non-emergency call, in step 500 the HNB supports CSG function and its access mode is Hybrid Access Mode, the HNB-GW makes an access control judgment on the UE, judging whether the UE accesses with an Open membership or a Close membership; the judgment basis may be an IMSI list of is UEs subscribed with the HNB or other judging methods, this belongs to prior art, so no details repeat;

step 508: the HNB-GW allocates a Connect-ID to the UE and transmits an HNBAP UE register accept message to the HNB, the HNBAP UE register accept message including both the Connect-ID and the access mode of the UE;

here, the access mode of the UE can be notified by the HNB-GW by multiple means, such as presenting the Close membership via default, presenting the Open membership explicitly, or presenting both Close and Open memberships explicitly; the specific implementation is not used for limiting the protection scope of the disclosure;

It should be noted that, if the HNB-GW determines that the UE can not access to the HNB, then it transmits an HNBAP UE register reject message to the HNB;

step 509: if the HNB accepts the access of the UE, the HNB transmits a Connect message to the HNB GW, the Connect message including an Initial UE massage;

step 510: the HNB-GW receives the Connect message, includes the Initial UE Message into a SCCP connection request and forwards it to a CN, so as to trigger an SCCP establishment;

step 511: the CN acknowledges the message for the SCCP connection;

step 512: the UE continues the NAS flow.

As shown in FIG. 5, the UE register flow is completed under the condition that a CSG non-supported UE accesses to a CSG supported HNB and the access mode of the HNB is Hybrid Access Mode.

Figure 6:
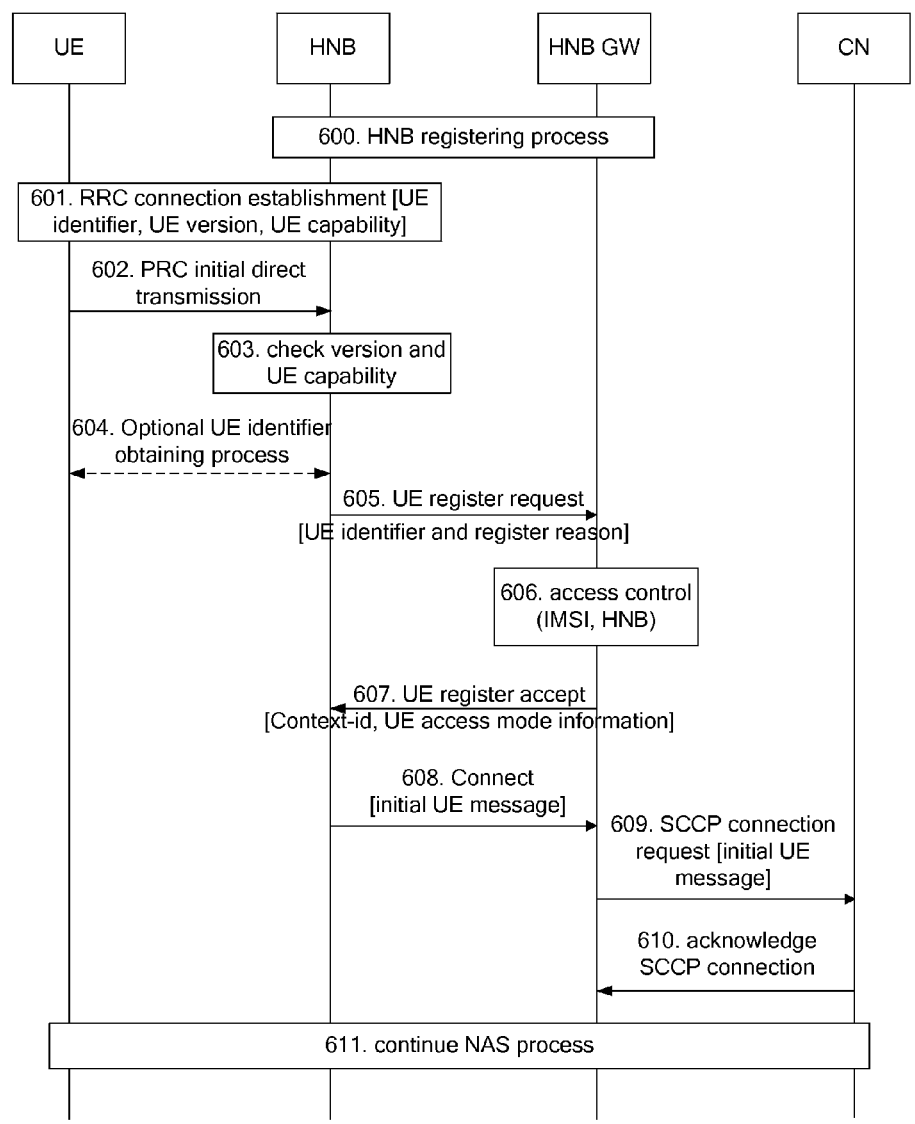
FIG. 6 shows a flow chart of the second embodiment for realizing a registration in an HNB system of this disclosure.

FIG. 6 shows a flow chart of the second embodiment for realizing a registration in the HNB system, the second embodiment shows a register method for a UE under the condition that a CSG non-supported UE sends an emergency call under the architecture of a CSG supported HNB in Hybrid Access Mode, including:

step 600: the HNB completes registering;

this step is a precondition for UE access, namely it is necessary to firstly guarantee is the completion of the HNB register. After the HNB register is completed, the HNB notifies its access mode to the HNB-GW;

the HNB supports CSG function and is in Hybrid Access Mode;

step 601: the UE establishes an RRC connection with the HNB, during this process, the UE includes its identifier (such as IMSI or TMSI), capability information and version information into an RRC connection establishment message and transmits the message to the HNB;

step 602: the UE transmits an RRC initial direct transmission message to the HNB, which includes an initial NAS message, such as Attach Request or Location Update (LU) Request or other NAS messages;

step 603: the HNB checks the capability of the UE, if the UE does not support CSG function and its identifier is not recorded in the HNB, namely no Connect-ID allocated to the UE is recorded, then step 605 is executed;

further, step 604 is included: prior to the register, the HNB triggers a flow of obtaining UE IMSI;

step 605: the HNB transmits a UE register message (UE Register Request) to the HNB-GW, the UE register message including the identifier of the UE, the register reason and other information; and step 606-step 607: the HNB-GW checks the capability and register reason of the UE, if it is indicated that the UE sends an emergency call, the HNB-GW treats the UE as a Close member, and notifies the HNB of the UE access mode via a UE register accept message, and allocates a Connect-ID as a signaling connection identifier.

Another processing method for step 606 is: the HNB-GW checks the capability and register reason of the UE, if it is indicated that the UE sends an emergency call, the HNB-GW accepts access of the UE, the HNB treats the UE as a Close member according to the access reason that the UE sends an emergency call, the HNB-GW does not need to transmit the access mode of the UE to the HNB via the UE register accept message.

The implementation of step 608-step 611 is totally the same as that of the step 509-step 512, no detail repeat.

The access of a non-CSG UE which makes an emergency call is realized via the second embodiment as shown in FIG. 6.

Figure 7:
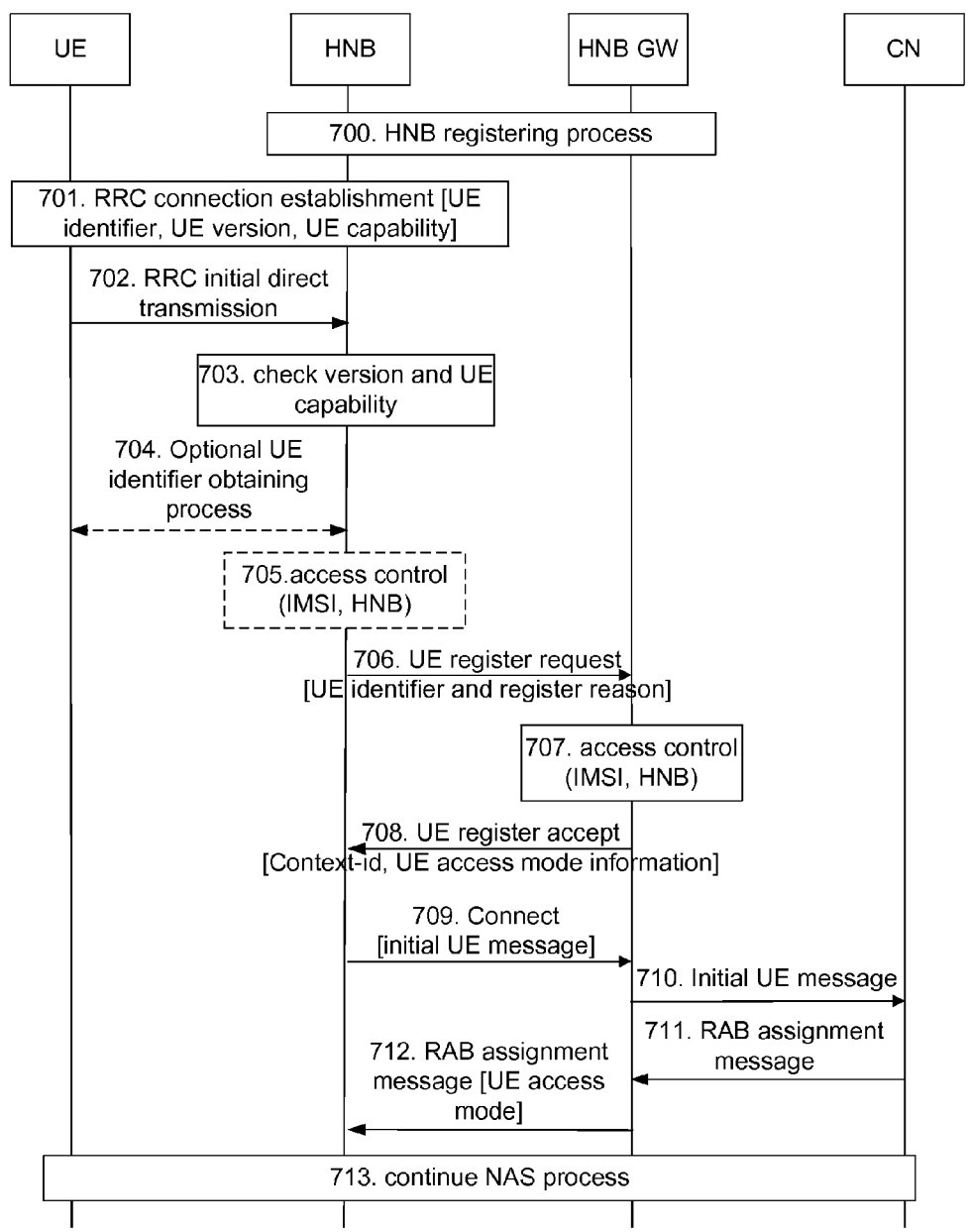
FIG. 7 shows a flow chart of the third embodiment for realizing a registration in an HNB system of this disclosure.

FIG. 7 shows a flow chart of the third embodiment for realizing a registration in the HNB system, in the third embodiment, after the UE register is completed, the UE access mode is notified to the HNB via the HNB GW when Radio Access Bearer (RAB) is established for the first time.

step 700: the HNB completes registering;

this step is a precondition for UE access, namely it is necessary to firstly guarantee the completion of the HNB register. After the HNB register is completed, the HNB notifies its access mode to the HNB-GW;

the HNB supports CSG function and is in Hybrid Access Mode.

step 701: the UE establishes an RRC connection with the HNB, during this process, the UE includes its identifier (such as IMSI or TMSI), capability information and version information into an RRC connection establishment message and transmits the message to the HNB;

step 702: the UE transmits an RRC initial direct transmission message to the HNB, which includes an initial NAS message, such as Attach Request or Location Update (LU) Request or other NAS messages;

step 703: the HNB checks the capability of the UE, if the UE does not support CSG function and its identifier is not recorded in the HNB, namely there is no recorded of a Connect-ID allocated to the UE, step 506 is executed; if a Connect-ID allocated to the UE is recorded in the HNB, then the registration of the UE is not necessary any more, and this flow is ended;

further, step 704 is included: prior to registering, the HNB triggers a flow of obtaining UE IMSI;

further, step 705 is included: the HNB performs an access control via the IMSI of the UE as well as via local resources;

step 706: the HNB transmits a UE register message (UE register request) to the HNB-GW, the UE register message including the identifier and register reason of the UE;

step 707: the HNB-GW checks the capability and register reason of the UE, if it is indicated that the UE does not support CSG function and sends a non-emergency call, in step 500 the HNB supports CSG function and its access mode is Hybrid Access Mode, the HNB-GW makes an access control judgment on the UE, judging whether the UE accesses with an Open membership or with a Close membership: the judgment basis can be an IMSI list of UEs subscribed with the HNB or other judging methods, which belongs to existing technology, no details repeat;

step 708: the HNB-GW allocates a Connect-ID to the UE, and transmits an HNBAP UE register accept message to the HNB;

it should be noted that if the HNB-GW determines that the UE can not access to the HNB, then it transmits an HNBAP UE register reject message to the HNB;

step 709: if the HNB accepts access of the UE, the HNB transmits a Connect message to the HNB GW, the Connect message including an Initial UE massage;

step 710: the HNB-GW receives the Connect message, and forwards the Initial UE Message to the CN;

step 711: the CN transmits an RAB assignment request message to the HNB;

step 712: after the HNB-GW receives the RAB assignment request message which is transmitted by the CN to the HNB, the HNB-GW notifies the HNB of the access membership of the UE via the RANNAP message by alternating this message; after receiving the RAB assignment request message, the HNB reads access mode information of the UE therefrom; and step 713: the UE continues the NAS flow.

The UE access mode information is notified from the HNB-GW to the HNB by the flow shown in FIG. 7.

Figure 8:
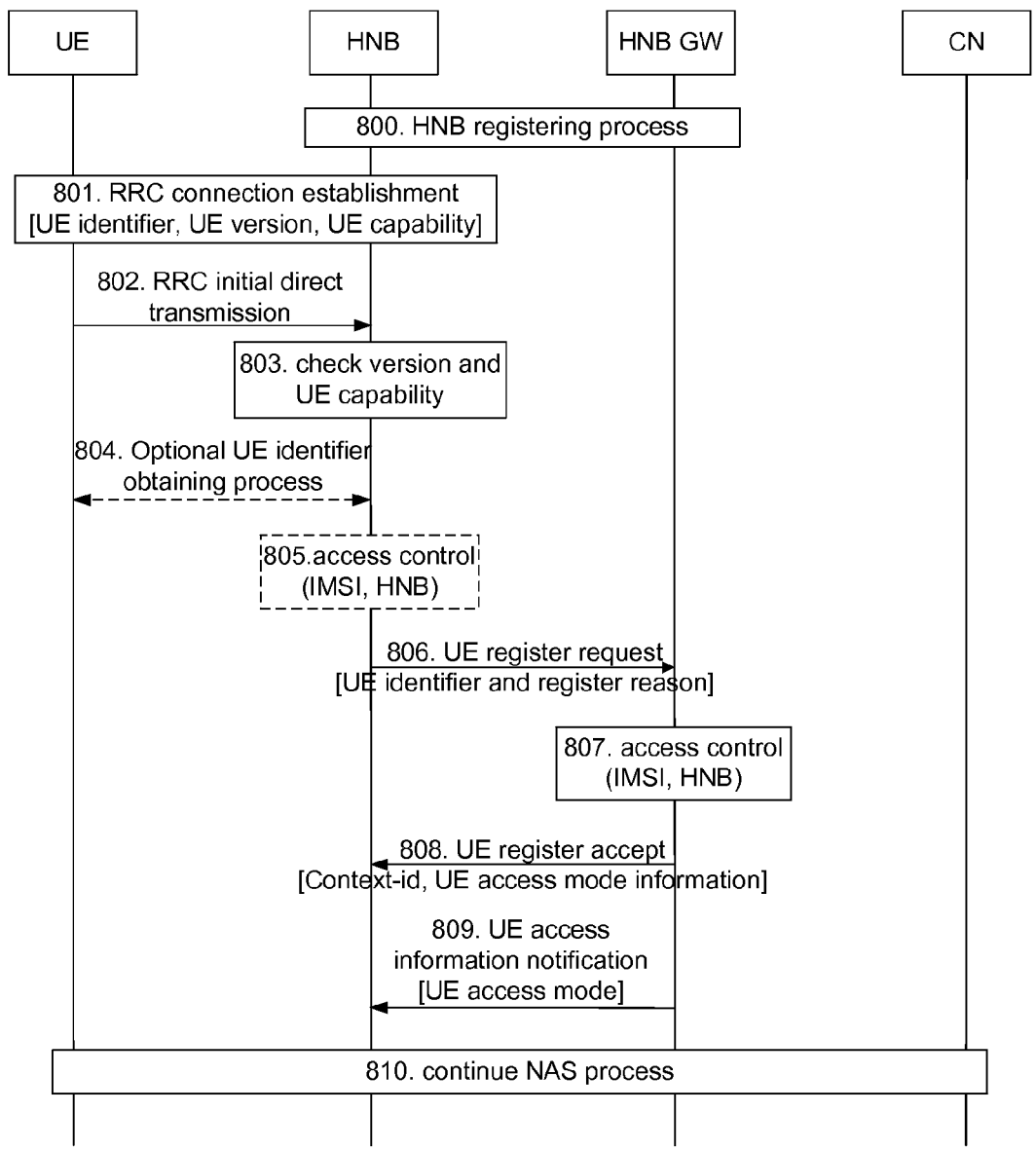
FIG. 8 shows a flow chart of the forth embodiment for realizing a registration in an HNB system of this disclosure.

FIG. 8 shows a flow chart of the forth embodiment for realizing a registration in the HNB system, in the forth embodiment, after completing an access control on the UE, the HNB GW notifies the HNB of the access mode of the UE via a new added message.

step 800: the HNB completes registering.

As a precondition for UE access, it is necessary to complete the HNB register at first. After the HNB register is completed, the HNB notifies its access mode to the HNB-GW.

The HNB supports CSG function and is in Hybrid Access Mode.

step 801: the UE establishes an RRC connection with the HNB, during this process, the UE includes its identifier (such as IMSI or TMSI), capability information and version information into an RRC connection establishment message and transmits this message to the HNB.

step 802: the UE transmits an RRC initial direct transmission message to the HNB, which includes an initial NAS message, such as Attach Request or Location Update (LU) Request or other NAS messages.

step 803: the HNB checks the capability of the UE, if the UE does not support CSG function and its identifier is not recorded in the HNB, namely there is no record of a Connect-ID allocated to the UE, then step 506 is executed; if a Connect-ID allocated to the UE is recorded in the HNB, then it is not necessary for the UE to be registered any more, and the flow is terminated.

Further, step 804 is included: prior to registering, the HNB triggers a flow of obtaining UE IMSI.

Further, step 805 is included: the HNB performs an access control via the IMSI of the UE as well as via local resources.

step 806: the HNB transmits a UE register request to the HNB-GW, the UE register request including the identifier and register reason of the UE.

step 807: the HNB-GW checks the capability and register reason of the UE, if it is indicated that the UE does not support CSG function and makes a non-emergency call, in step 500 the HNB supports CSG function and its access mode is Hybrid Access Mode, the HNB-GW makes an access control judgment on the UE, judging whether the UE accesses with an Open membership or with a Close membership: the judgment basis may be an IMSI list of UEs subscribed with the HNB or other judging methods, which belongs to existing technology, no details repeat.

step 808: the HNB-GW allocates a Connect-ID to the UE, and transmits a UE register accept message to the HNB.

It should be noted that, if the HNB-GW determines that the UE can not access to the HNB, then the HNB-GW transmits a UE register reject message to the HNB.

step 809: the HNB-GW notifies access mode information of the UE to the HNB via a new added UE access information notification message.

step 810: the UE continues the NAS flow.

The access mode of the UE is notified from the HNB-GW to the HNB through the flow shown in FIG. 8.

Under the condition that the concept similar to Hybrid Access Mode but not the concept of CSG is introduced to an HNB, during a UE register procedure, the method of the disclosure can also be applicable, no detail repeat.

All the above are just preferred embodiments of this disclosure but not for limiting the protection scope of this disclosure; any modifications, equivalent replacements, improvements and the like within the spirit and principle of the disclosure shall fall within the scope of protection of the disclosure.

The invention claimed is:

1. A method for a Home NodeB (HNB) to obtain an access mode of a user equipment (UE), wherein the HNB supports a CSG function and is in a hybrid access mode, the method comprising:

determining, by a Home NodeB Gateway (HNB GW), whether the UE supports a CSG function and whether the UE is making an emergency call, based on capability and register reason of the UE sent through the HNB from the UE during a UE registering process;

performing, by the HNB GW, an access control on the UE when the UE does not support the CSG function;

determining, by the HNB GW, an access mode of the UE based on a list of International Mobile Subscriber Identities (IMSIs) of UEs subscribed with the HNB, when the UE does not support the CSG function and the UE is not making an emergency call; and transmitting the access mode by the HNB GW to the HNB, wherein the list of IMSIs of UEs subscribed with the HNB is stored in the HNB GW and is not stored in the HNB.

2. The method according to claim 1, further comprising:

completing registering of the HNB and notifying the access mode of the HNB to the HNB GW, prior to the method.

3. The method according to claim 1, wherein the determining an access mode of the UE comprises:

judging, by the HNB-GW, whether the UE accesses with an Open membership or with a Close membership;

if the UE accesses with an Open membership, then the access mode of the UE is Open;

if the UE accesses with a Close membership, then the access mode of the UE is Close.

4. The method according to claim 1, wherein when the HNB-GW determines the UE is making an emergency call, then the HNB-GW determines that the UE accesses with a Close membership and its access mode is Close.

5. The method according to claim 1, wherein when the HNB determines that the UE makes an emergency call according to a calling type of the UE, the HNB determines that the UE accesses with a Close membership and the access mode of the UE is Close.

6. The method according to claim 1, wherein the access mode of the UE is included into a UE register accept message, or a radio access bearer (RAB) message, or a new added UE access information notification and transmitted to the HNB.

7. The method according to claim 6, wherein the access mode of the UE presents Close via default and presents Open explicitly; or, it presents Close or Open explicitly.

8. A system for a Home NodeB (HNB) to obtain an access mode of a user equipment (UE), at least comprising a UE, an HNB and a Home NodeB Gateway (HNB GW), wherein, the HNB supports a CSG function, is in a hybrid access mode, and is configured for receiving an access mode of the UE from the HNB GW;

the HNB GW is configured for determininq whether the UE supports a CSG function and whether the UE is making an emergency call based on capability and register reason of the UE sent through the HNB from the UE during a UE registering process, performing an access control on the UE when the UE does not support the CSG function, determining the access mode of the UE based on a list of International Mobile Subscriber Identities (IMSIs) of UEs subscribed with the HNB when the UE does not support the CSG function and the UE is not making an emergency call, and transmitting the access mode to the HNB, wherein the list of IMSIs of UEs subscribed with the HNB is stored in the HNB GW and is not stored in the HNB.

9. The system according to claim 8, wherein the HNB is further configured for completing registering, and notifying its access mode to the HNB GW.

10. The method according to claim 2, wherein the access mode of the UE is included into a UE register accept message, or a radio access bearer (RAB) message, or a new added UE access information notification and transmitted to the HNB.

11. The method according to claim 3, wherein the access mode of the UE is included into a UE register accept message, or a radio access bearer (RAB) message, or a new added UE access information notification and transmitted to the HNB.

12. The method according to claim 10, wherein the access mode of the UE presents Close via default and presents Open explicitly; or, it presents Close or Open explicitly.

13. The method according to claim 11, wherein the access mode of the UE presents Close via default and presents Open explicitly; or, it presents Close or Open explicitly.

* * * * *